United States Patent
Shim et al.

(10) Patent No.: US 9,482,343 B2
(45) Date of Patent: Nov. 1, 2016

(54) PISTON RING FOR ENGINE

(75) Inventors: So Jung Shim, Seoul (KR); Jeong Uk An, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 873 days.

(21) Appl. No.: 13/611,177

(22) Filed: Sep. 12, 2012

(65) Prior Publication Data

US 2013/0241154 A1 Sep. 19, 2013

(30) Foreign Application Priority Data

Mar. 16, 2012 (KR) .................. 10-2012-0027221

(51) Int. Cl.
*F16J 9/00* (2006.01)
*F16J 9/26* (2006.01)

(52) U.S. Cl.
CPC ........................ *F16J 9/26* (2013.01)

(58) Field of Classification Search
CPC ........................ F16J 9/26; F16J 9/28
USPC ........................ 277/434, 440–444
See application file for complete search history.

(56) References Cited

U.S. PATENT DOCUMENTS

| 5,700,551 A | 12/1997 | Kukino et al. | |
| 2007/0259184 A1* | 11/2007 | Martin et al. | 428/408 |
| 2011/0143976 A1* | 6/2011 | Ito et al. | 508/109 |
| 2011/0162751 A1* | 7/2011 | Fitzgerald et al. | 138/145 |
| 2011/0220348 A1* | 9/2011 | Jin et al. | 166/244.1 |
| 2012/0034393 A1* | 2/2012 | Ando et al. | 427/569 |

FOREIGN PATENT DOCUMENTS

| JP | 10-237672 | 9/1998 |
| JP | 2006-022666 A | 1/2006 |
| KR | 10-2006-0071989 A | 6/2006 |

* cited by examiner

*Primary Examiner* — Vishal Patel
*Assistant Examiner* — Stacy Warren
(74) *Attorney, Agent, or Firm* — Mintz Levin Cohn Ferris Glovsky and Popeo, P.C.; Peter F. Corless

(57) ABSTRACT

Disclosed is a piston ring for engine that includes chromium (Cr) coating layer coated on the surface of a base material of the piston ring of an engine; a chromium nitride (CrN) coating layer; and a silicon-incorporated diamond-like carbon (Si-DLC) coating layer, which is formed on the CrN coating layer, and contains Si component of about 3~10 at %, and a method for manufacturing thereof.

8 Claims, 6 Drawing Sheets

PISTON RING FOR ENGINE

CROSS-REFERENCE TO RELATED APPLICATION

This application claims under 35 U.S.C. §119(a) the benefit of Korean Patent Application No. 10-2012-0027221, filed on Mar. 16, 2012, the entire contents of which are incorporated herein by reference.

BACKGROUND (a) Technical Field

The present disclosure relates to a piston ring for engine wherein low friction Si-DLC is coated on the peripheral surface of the piston ring to reduce friction loss in an engine cylinder and to improve fuel efficiency, and a method for manufacturing thereof.

(b) Background Art

A piston ring is a pair of rings that fits into a groove on the outer diameter of a piston to maintain air tightness between a piston of a vehicle engine and inner cylinder wall, and to prevent entering lubricating oil to a combustion chamber by scraping out the lubricating oil of the cylinder wall.

FIG. 1 is a drawing representing coating condition of the existing piston ring for engine. In this conventional piston ring design, the piston ring has difficulty maintaining durability due to its low friction efficiency. Generally, Cr (Chrome) plating 30 or nitriding (gas nitriding) is being used on the peripheral surface of the piston ring 10, and recently, due to high fuel cost and $CO_2$ regulation, various surface treatment techniques including CrN (Chrome Nitride) are also becoming more popular for reducing friction loss and improving durability.

Furthermore, methods like DLC (Diamond Like Carbon), which is an intermediate phase of diamond and graphite, and has low friction coefficient of graphite, high rigidity of diamonds and excellent chemical resistance, can further reduce friction loss of the engine when it is applied to the peripheral surface of the piston ring and can improve fuel efficiency of a vehicle in the end. However, the friction and durability of DLC becomes worse when it is exposed to higher temperatures for a long period of time, and coating is exfoliated due to high residual stress in the coating as the coating becomes thicker.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE DISCLOSURE

The present invention has been made in an effort to solve the above-described problems associated with prior art. It is an object of the present invention to provide a piston ring for an engine, which provides low friction properties and high durability at the same time by coating Si-DLC (Silicon doped Diamond Like Carbon) on the peripheral surface of the piston ring to reduce friction loss in an engine cylinder and to improve fuel efficiency.

In order to accomplish the above objectives, the piston ring of the present invention is characterized by comprising: a chromium (Cr) coating layer coated on the surface of a base material; a chromium nitride (CrN) coating layer coated on the Cr coating layer; and a Si-DLC coating layer, which is formed on the CrN coating layer, and alternately laminated with low content layers containing a first Si component of about 3 at % or less (not including 0 (zero)) and high content layers containing a second Si component of about 3~10 at %.

The low content layer and the high content layer may be characterized as having a thickness of 50 nm or less (not including 0 (zero)), respectively. Furthermore, the high content layer is in contact with an inner cylinder wall due to the coating being located on the outer-most layer of the Si-DLC coating layer.

The Si-DLC coating layer may be formed by a chemical reaction of hydrocarbon gas ($C_xH_y$) and TMS (Tetra-methylsilane, $Si(CH_3)_4$) gas, or hydrocarbon gas and HMDSO (Hexamethyldisiloxane, $O(Si(CH_3)_3)_2$) gas. In addition, the Cr coating layer and the Si-DLC coating layer may be coated only on the outer peripheral surface of the base material contacted with the inner cylinder wall.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
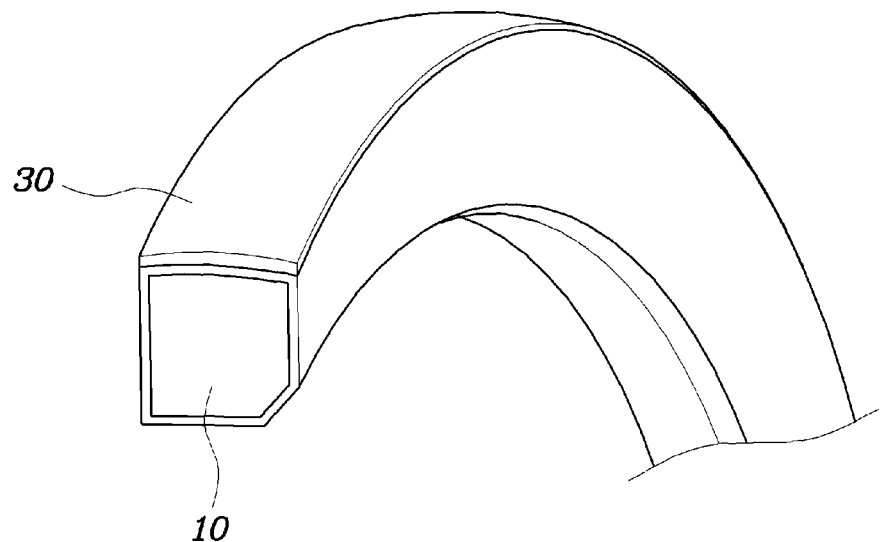
FIG. 1 is a drawing representing conventional coating conditions of the existing piston ring for engine.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter, a piston for engine and a method for manufacturing thereof according to the preferred embodiments of the present invention now will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, plug-in hybrid electric vehicles. As referred to herein, a hybrid vehicle is a vehicle that has two or more sources of power, for example both gasoline-powered and electric-powered vehicles.

Figure 2:
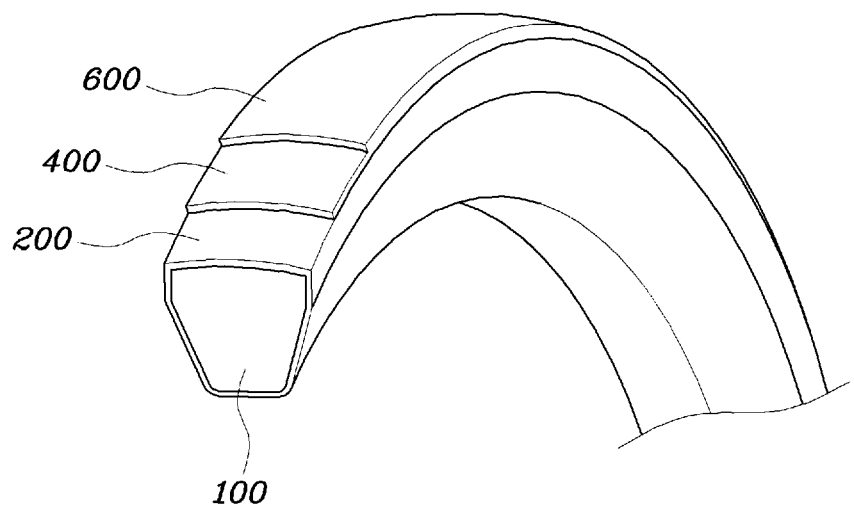
FIG. 2 is a drawing representing the piston ring for engine according to an exemplary embodiment of the present invention.
Figure 3:
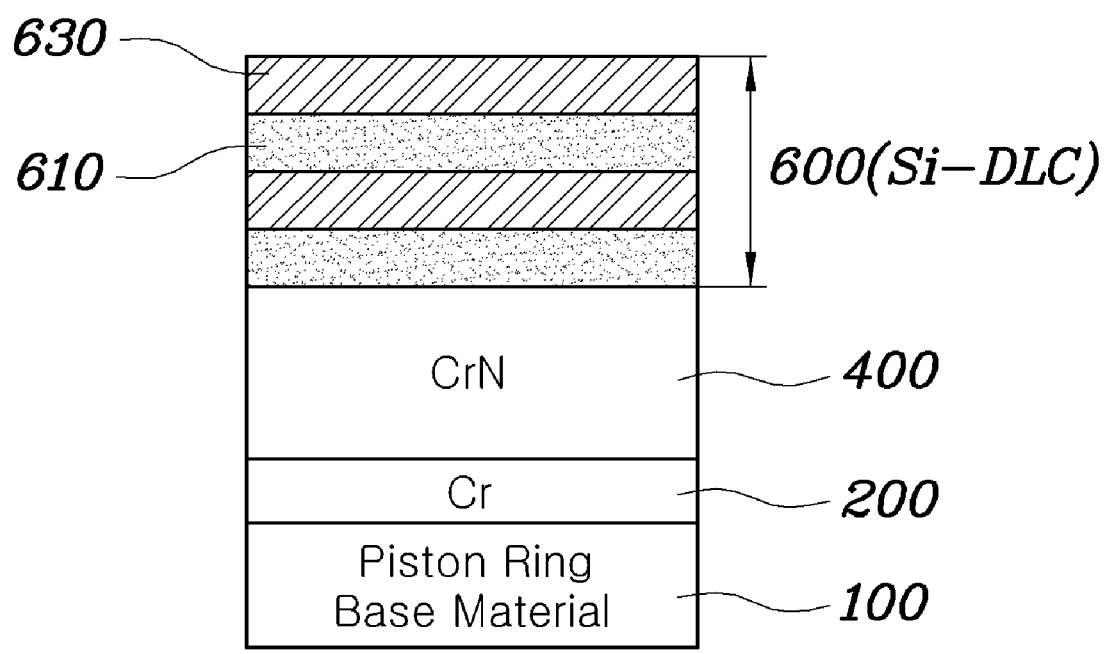
FIG. 3 is a drawing representing a cross section of the coating of the piston ring for engine illustrated in FIG. 2.

FIG. 2 is a drawing representing a piston ring for engine according to an exemplary embodiment of the present invention, and FIG. 3 is a drawing representing a cross section of the coating of the piston ring for engine illustrated in FIG. 2.

The piston ring of the illustrative embodiment of the present invention includes a Cr coating layer 200 coated on the surface of a base material 100, and a Si-DLC coating layer 600, which is coated on the outer-most layer of the base material 100, and alternately mixed with low content layers 610 containing a first Si component of about 3 at % or less (not including 0 (zero)) and high content layers 630 containing a second Si component of about 3~10 at %. The exemplary piston ring of the illustrative embodiment of the present invention also includes a CrN coating layer 400 coated between the Cr coating layer 200 and the Si-DLC coating layer 600.

The piston ring of the illustrative embodiment of the present invention consisting of the structure described above reduces friction loss of the piston ring and improves fuel efficiency by about 0.2~0.5% since friction coefficient of the Si-DLC is 23% lower than Cr plating and nitriding and 11% lower than CrN. Additionally, oil film destruction can be suppressed and durability of the piston ring can be improved since resistance to scuffing of the Si-DLC is 50% or more better than Cr plating and nitriding and 30% or more better than CrN. Further, the low-friction properties and high temperature wear resistance of the DLC can be improved by doping Si on the DLC, and the durability of the piston ring can be improved since a Cr+CrN sub-multi-layer is provided in case the Si-DLC is worn away.

Meanwhile, the Si-DLC coating layer 600 is characterized that the thickness of the low content layer 610 and the high content layer 630 may be 50 nm or less (not including 0 (zero)), respectively, and preferably, the thickness of the low content layer 610 and the high content layer 630 are same.

The high content layer 630 can improve durability and reduce friction but has weak rigidity. Therefore, in order to make up for its weak rigidity, a low content layer 610 having lower content of a second Si component than the high content layer 630 is formed together one on top of the other alternately, and in this case, it is preferred to form the low content layer 610 and the high content layer 630 with the same thickness to ensure the piston ring has an uniform rigidity over the entire region.

The low content layer 610 and the high content layer 630 are alternately laminated one by one from the CrN coating layer 400, and the high content layer 630 having excellent durability and friction reduction is coated on the outer-most layer of the Si-DLC coating layer 600 to be in contact with the inner cylinder wall. As a result, the Si-DLC coating layer 600 can maintain its low friction and durability even at higher temperature according to the Si content ratio.

Meanwhile, the Si-DLC coating layer 600 may be formed by a chemical reaction of hydrocarbon gas ($C_xH_y$) and TMS (Tetra-methylsilane, $Si(CH_3)_4$) gas, or hydrocarbon gas and HMDSO (Hexamethyldisiloxane, $O(Si(CH_3)_3)_2$) gas. Furthermore, it may also be effective to coat the Cr coating layer 200 and Si-DLC coating layer 600 only on the peripheral surface of the base material 100 contacted with the inner cylinder wall.

Thus, the Si-DLC applied in the present invention is an effective coating material to improve low friction, wear resistance and resistance to scuffing of the piston ring since it has a lower friction coefficient and higher rigidity than CrN, and its low friction and durability can be maintained even at higher temperature unlike a general DLC coating (e.g., due to the present invention's low content layer 610 and the high content layer 630 according to the Si content ratio).

Figure 4:
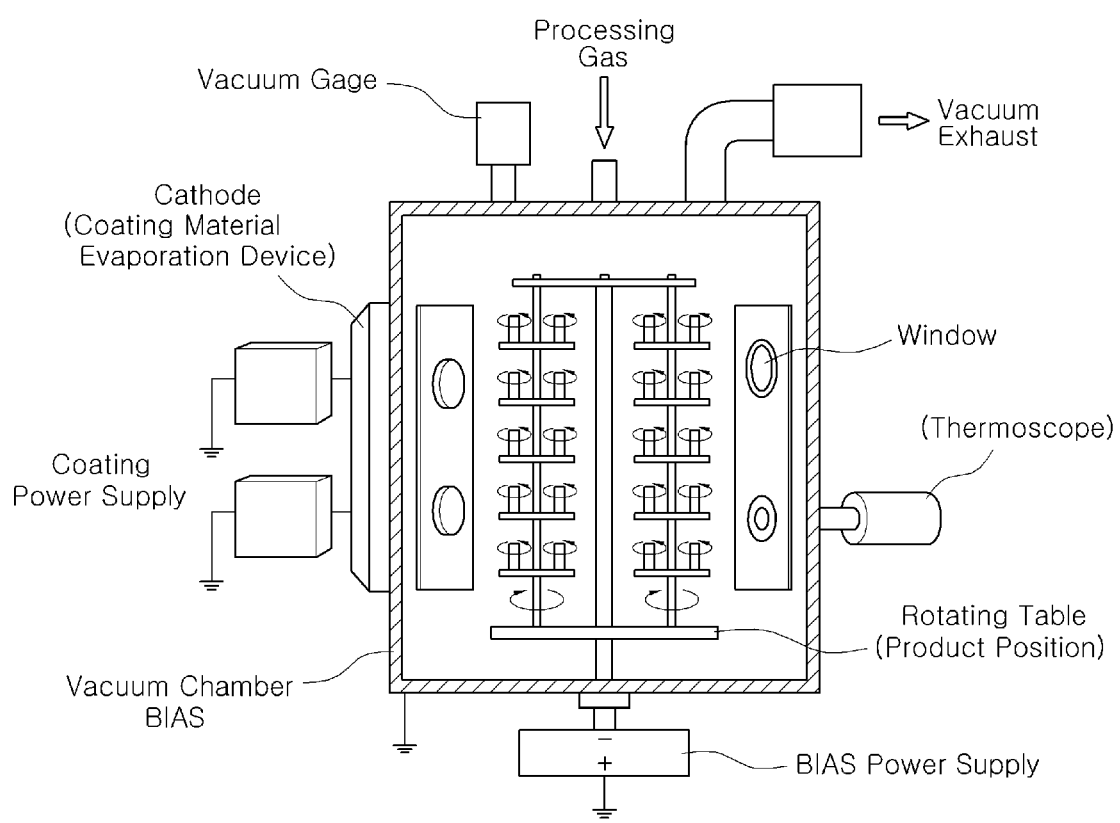
FIG. 4 is a device for manufacturing the piston ring for engine illustrated in FIG. 2.

FIG. 4 is a device for manufacturing the piston ring for engine illustrated in FIG. 2, and the method for manufacturing the piston ring for engine of the present invention is as follows.

The method for manufacturing the piston ring for engine according to the present invention includes a Cr coating step of coating a Cr coating layer 200 on a base material 100 of the piston ring; and a Si-DLC coating step of coating a Si-DLC coating layer 600 by a chemical reaction of hydrocarbon gas ($C_xH_y$) and TMS (Tetra-methylsilane, $Si(CH_3)_4$) gas, or hydrocarbon gas and HMDSO (Hexamethyldisiloxane, $O(Si(CH_3)_3)_2$) gas, and to have low content layers 610 containing a first Si component of about 3 at % or less (not including 0 (zero)) and high content layers 630 containing a second Si component of about 3~10 at %.

Herein, the method may further comprises a CrN coating step of coating a CrN coating layer 400 by chemically reacting $N_2$ gas with sputtered Cr ions between the Cr coating step and the Si-DLC coating layer. Further, in the Si-DLC coating step, the Si content may be controlled by controlling the injection amount of TMS or HMDSO gas.

Namely, the low content layer 610 can be controlled to contain the first Si component in an amount of about 3 at % or less (not including 0 (zero)) and the high content layer 630 can be controlled to contain the second Si component in an amount of about 3~10 at %.

Specifically, as shown in FIG. 3, the Si-DLC coating applied in the present invention is coated on the peripheral surface of the base material 100 of the piston ring into a multi-layer structure of Cr (PVD, Physical Vapor Deposition method)+Corn (PVD method)+Si-DLC (PACVD method), and the outer-most layer of the Si-DLC is coated to alternately laminate the high content layers 630 containing the second Si component of about 3~10 at % and the low content layers 610 containing the first Si component of about 3 at % or less (not including 0 (zero)) one by one from the CrN coating layer 400.

At this time, the low content layer 610 and the high content layer 630 may be coated to the thickness of 50 nm or less (not including 0 (zero)), respectively, and the low content layer 610 and the high content layer 630 may be coated to the same thickness, preferably.

The piston ring of the present invention may be coated in a vacuum coating device as illustrated in FIG. 4, which uses a Cr target and a process gas of Ar, $N_2$ and hydrocarbon gas ($C_xH_y$), TMS (Tetra-methylsilane, $Si(CH_3)_4$) or HMDSO (Hexamethyldisiloxane, $O(Si(CH_3)_3)_2$).

First, a plasmatic state is induced using Ar gas under vacuum condition, the surface of the piston ring is activated by heating a coating chamber to about 80° C., and the surface of the piston ring is cleaned by adding bias to force the Ar ions to crash into the surface of the piston ring (baking & cleaning).

Next, the Cr layer is coated using only the Cr target to improve adhesion property between the coating layer and the base material (thickness: 0.1~1.0 μm). The CrN layer is then coated by a chemical reaction of the discharged processing gas $N_2$ and the sputtered Cr ions on the Cr target (thickness: 0.1~10 μm).

Once the chemical reaction has been conducted using hydrocarbon gas and TMS, or HMDSO gas without the Cr target, C and Si are combined with each other, and the Si-DLC layer is formed (e.g., having a thickness of preferably about 0.1~10 μm). At this time, by controlling gas containing Si (TMS or HMDSO), a low content layer 610 containing a first Si component of about 3 at % or less (not including 0 (zero)) and a high content layers 630 containing a second Si component of about 3~10 at % can be alternatively laminated one by one.

Figure 5:
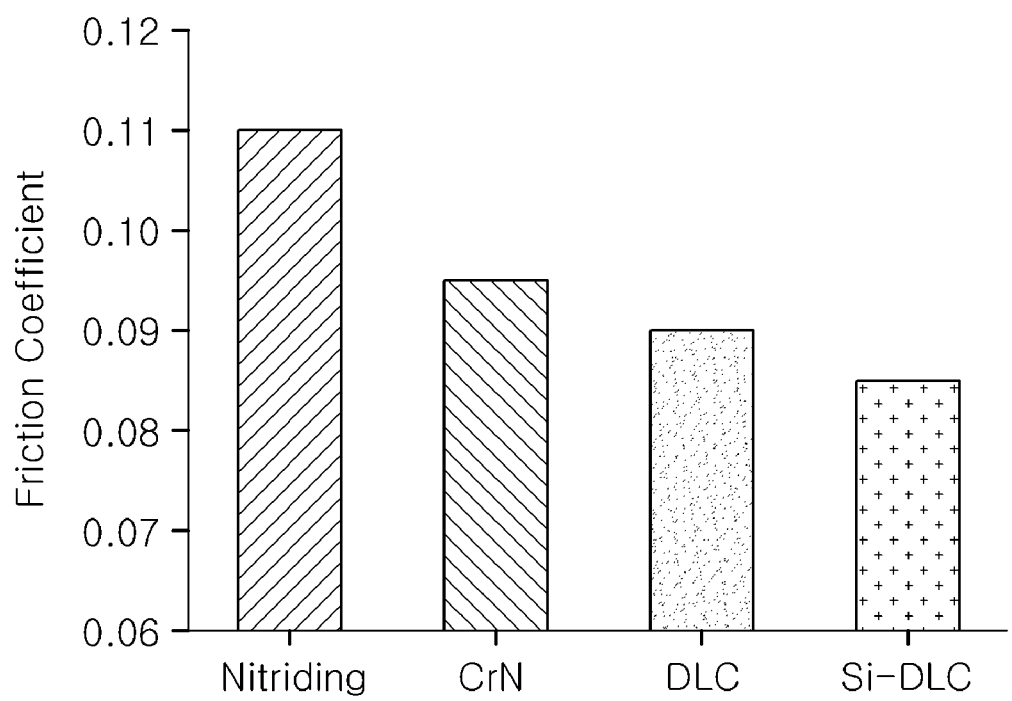
FIGS. 5 to 7 are drawings comparing performances of Examples and Comparative Examples of the present invention.
Figure 6:
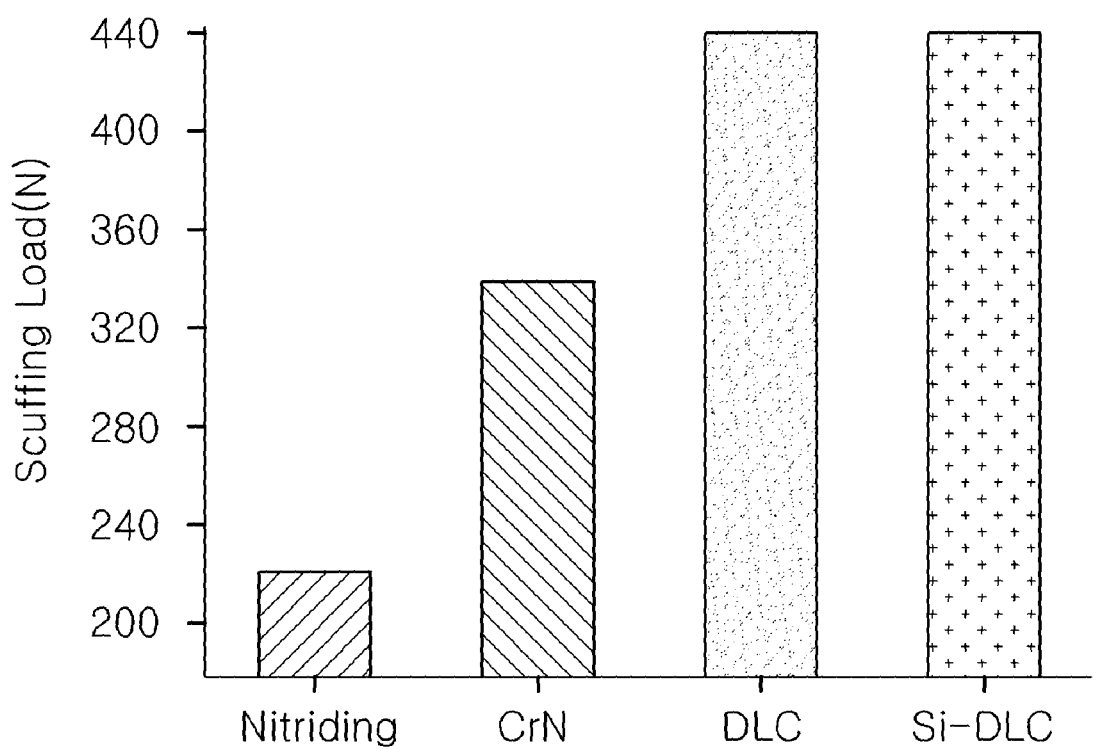
Figure 7:
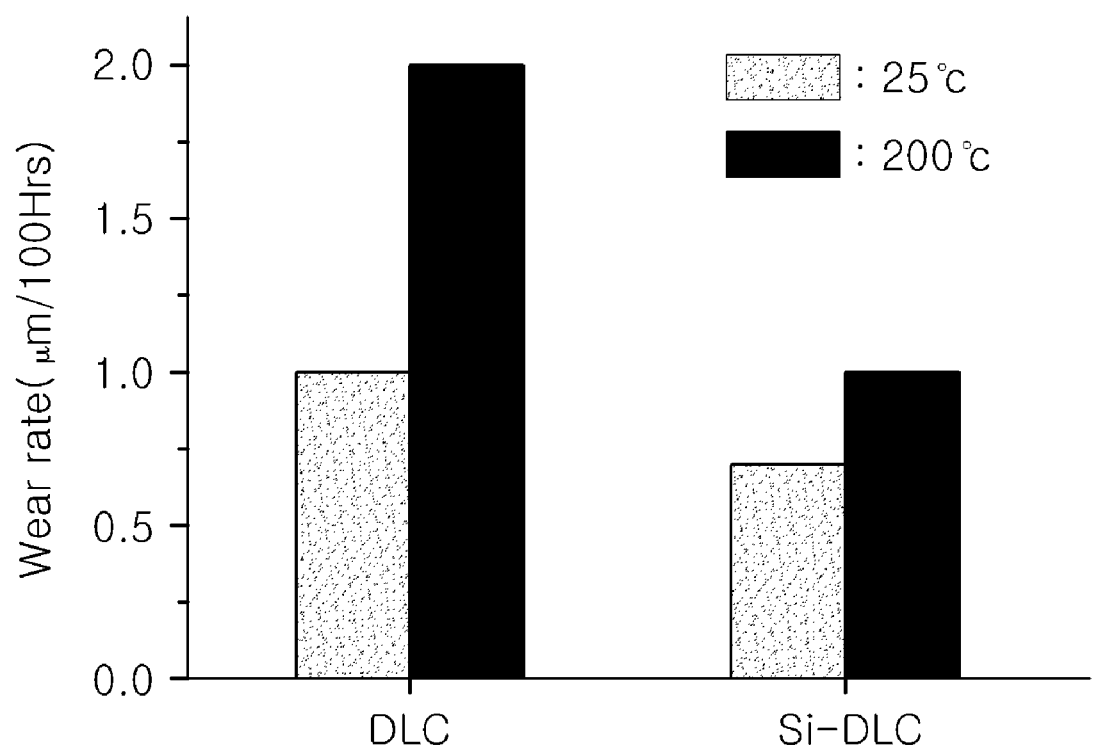

And, FIGS. 5 to 7 are graphical illustrations comparing performances of Examples and Comparative Examples of the illustrative embodiment of the present invention.

FIG. 5 represents the comparison of friction coefficient. Friction coefficient between the piston ring and cylinder liner was measured using an oscillating friction-wearing tester. Test was conducted at load of 150 N, temperature of 150° C., oscillating period of 5 Hz and oil condition for 1 hour. As a result, friction coefficient of nitriding was the highest, and friction coefficient of Si-DLC was the lowest in order of Si-DLC<DLC<CrN<nitriding as shown in FIG. 5. Further, fiction coefficient of the Si-DLC became lower according to doping Si while changing its content ratio as described above.

FIG. 6 represents the comparison of resistance to scuffing, and scuffing load between the piston ring and cylinder liner which were measured using an oscillating friction-wearing tester to compare resistance to oil film destruction. Test was conducted at temperature of 150° C., oscillating period of 5 Hz and oil condition while increasing load with 20 N every 20 min up to 440 N. As a result, nitriding generated scuffing most quickly in order of nitriding<CrN<DLC=Si-DLC, and scuffing load of the DLC and Si-DLC were the highest as shown in FIG. 6.

FIG. 7 represents the comparison of high temperature wear resistance, and piston ring wear between the piston ring and cylinder liner was measured using an oscillating friction-wearing tester. Test was conducted at load of 150 N, temperature of 25° C. and 200° C., oscillating period of 5 Hz and oil condition for 1 hour. As a result, wear of the DLC was largely increased but wear of the Si-DLC was not increased significantly at high temperatures. Further, high temperature wear resistance was further improved when Si was doped while controlling its content.

Namely, the piston ring for engine of the present invention consisting of the structure described above and the method for manufacturing thereof accordingly reduces friction loss of the piston ring and improves fuel efficiency 0.2~0.5% since the friction coefficient of the Si-DLC is 23% lower than Cr plating and nitriding and 11% lower than CrN.

Further, because resistance to scuffing of the Si-DLC is 50% or more better than Cr plating and nitriding and 30% or more better than CrN, oil film destruction is suppressed and durability of the piston ring is improved. Furthermore, the low-friction properties and high temperature wear resistance of the DLC are improved by doping Si on the DLC. Additionally, durability of the piston ring can be improved since a Cr+CrN multi-layer is at lower layer when the Si-DLC is worn away.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A piston ring for an engine comprising:
    a chromium (Cr) coating layer coated on the surface of a base material;
    a chromium nitride (CrN) coating layer coated on the Cr coating layer; and
    a silicon-incorporated diamond-like carbon (Si-DLC) coating layer, which is formed on the CrN coating layer, and alternately laminated with low content layers containing a first Si component of 3 at % or less (not including 0 (zero)) and high content layers containing a second Si component of more than 3 at % and 10 at % or less, wherein a rigidity of the low content layers is higher than that of the high content layers,
    wherein the low content layers and the high content layers are essentially the same except for the Si content.

2. The piston ring for an engine of claim 1, wherein a thickness of each of low content layers and a thickness of each of the high content layers is 50 nm or less (not including 0 (zero)), respectively.

3. The piston ring for an engine of claim 1, wherein an outer-most layer of the high content layers is the outer-most layer of the Si-DLC coating layer.

4. The piston ring for an engine of claim 1, wherein the Si-DLC coating layer is formed by a chemical reaction of hydrocarbon gas ($C_xH_y$) and TMS (Tetra-methylsilane, $Si(CH_3)_4$) gas, or hydrocarbon gas and HMDSO (Hexamethyldisiloxane, $O(Si(CH_3)_3)_2$) gas.

5. A method of forming a piston ring for an engine, the method comprising:
    coating a chromium (Cr) coating layer on the surface of a base material;
    coating a chromium nitride (CrN) coating layer on the Cr coating layer; and
    forming a silicon-incorporated diamond-like carbon (Si-DLC) coating layer on the CrN coating layer by alternately laminating the CrN coating layer with low content layers containing a first Si component of 3 at % or less (not including 0 (zero)) and high content layers containing a second Si component of more than 3 at % and 10 at % or less, wherein a rigidity of the low content layers is higher than that of the high content layers,
    wherein the low content layers and the high content layers are essentially the same except for the Si content.

6. The method of claim 5, wherein a thickness of each of the low content layers and a thickness of each of the high content layers is 50 nm or less (not including 0 (zero)), respectively.

7. The method claim 5, wherein an outer-most layer of the high content layers is the outer-most layer of the Si-DLC coating layer.

8. The method of claim 5, further comprising: forming the Si-DLC coating layer by a chemical reaction of hydrocarbon gas ($C_xH_y$) and TMS (Tetra-methylsilane, $Si(CH_3)_4$) gas, or hydrocarbon gas and HMDSO (Hexamethyldisiloxane, $O(Si(CH_3)_3)_2$) gas.

* * * * *